United States Patent
Morris et al.

(10) Patent No.: US 6,631,460 B1
(45) Date of Patent: Oct. 7, 2003

(54) ADVANCED LOAD ADDRESS TABLE ENTRY INVALIDATION BASED ON REGISTER ADDRESS WRAPAROUND

(75) Inventors: Dale C. Morris, Menlo Park, CA (US); William R. Bry, Saratoga, CA (US); Alan H. Karp, Palo Alto, CA (US); William Chen, Sunnyvale, CA (US)

(73) Assignee: Institute for the Development of Emerging Architectures, L.L.C., Cupertino, CA (US)

( * ) Notice: Subject to any disclaimer, the term of this patent is extended or adjusted under 35 U.S.C. 154(b) by 0 days.

(21) Appl. No.: 09/559,508

(22) Filed: Apr. 27, 2000

(51) Int. Cl.⁷ .................................................. G06T 9/30
(52) U.S. Cl. ..................... 712/217; 712/228; 712/216
(58) Field of Search .................................. 712/217, 216, 712/228

(56) References Cited

U.S. PATENT DOCUMENTS

| | | | |
|---|---|---|---|
| 5,421,022 A | 5/1995 | McKeen et al. | |
| 5,438,677 A | 8/1995 | Adams et al. | |
| 5,625,835 A | 4/1997 | Ebcioglu et al. | |
| 5,634,023 A | 5/1997 | Adler et al. | |
| 5,694,577 A | 12/1997 | Kiyohara et al. | |
| 5,778,219 A | 7/1998 | Amerson et al. | |
| 5,794,029 A | 8/1998 | Babaian et al. | |
| 5,799,179 A | 8/1998 | Ebcioglu et al. | |
| 5,903,749 A | 5/1999 | Kenner et al. | |
| 5,915,117 A | 6/1999 | Ross et al. | |
| 5,941,977 A | 8/1999 | Panwar et al. | |
| 6,128,728 A | * 10/2000 | Dowling ..................... | 712/228 |
| 6,487,630 B2 | * 11/2002 | Bui ............................. | 711/109 |

FOREIGN PATENT DOCUMENTS

| | | |
|---|---|---|
| EP | 0568842 A2 | 11/1993 |
| EP | 0742512 A2 | 11/1996 |
| WO | WO 98/00769 | 1/1998 |
| WO | WO 99/19795 | 4/1999 |

OTHER PUBLICATIONS

Pohua P. Chang et al., "Three Architectural Models for Compiler–Controlled Speculative Execution," IEEE Transactions on Computers, vol. 44, No. 4, pp. 481–494 (Apr. 1995).

David M. Gallagher et al., "Dynamic Memory Disambiguation Using the Memory Conflict Buffer," ACM Press, ASPLOS VI Proceedings, pp. 183–193 (Oct. 1994).

Scott A. Mahlke et al., "Sentinel Scheduling: A Model for Compiler–Controlled Speculative Execution," ACM Transactions on Computer Systems, vol 11, No. 4, pp. 376–408 (Nov. 1993).

Scott A. Mahlke et al., "Sentinel Scheduling for VLIW and Superscalar Processors," ACM SIG Plan Notices, vol. 27, No. 9, pp 238–247 (Sep. 1992).

A copy of European Search Report for Application No. EP 01 30 3750 mailed on Dec. 23, 2002 (3 pages).

* cited by examiner

Primary Examiner—Eddie Chan
Assistant Examiner—Charles Harkness (57) ABSTRACT

A computer system includes physical registers holding data for compiled programs and a portion of the physical registers form a register stack which wraps around when full. An N-bit current wraparound count state tracks physical register remapping events which cause the register stack to wraparound or unwrap. An advanced load address table (ALAT) has entries corresponding to load instructions, each entry has at least one memory range field defining a range of memory locations accessed by a corresponding load instruction, a physical register number field corresponding to a physical register accessed in the corresponding load instruction, and an N-bit register wraparound field which corresponds to the N-bit current wraparound count state for the corresponding load instruction. A check instruction accesses the ALAT to determine whether a store instruction and an advanced load instruction, which is scheduled before the store instruction, potentially accessed a common memory location. After the execution of the store instruction, an absence of an entry corresponding to the load instruction in the ALAT indicates that a common memory location may have been accessed by the store and load instructions.

32 Claims, 7 Drawing Sheets

98

| Advanced Load Address Table (ALAT) | | | | | |
|---|---|---|---|---|---|
| Memory Address | Memory Access Size | Register Wraparound | Physical Register Number | Register Type | Valid Bit |
| | | | | | |
| | | | | | |
| | | | | | |
| | | | | | |
| 112 | 114 | 122 | 118 | 120 | 116 |

I22: st [r1] = r3
I24: ld r4 = [r2]
I26: add r5 = r4, r6

ORIGINAL CODE

I24: ld.a r4 = [r2]
I26: add r5 = r4, r6
I22: st [r1] = r3
I25: chk.a r4, 124r

I24r: ld r4 = [r2]
I26r: add r5 = r4, r6
I23r: br 125

SCHEDULED CODE WITH
OUT-OF-LINE RECOVERY

| Advanced Load Address Table (ALAT) | | | | | |
|---|---|---|---|---|---|
| Memory Address | Memory Access Size | Register Wraparound | Physical Register Number | Register Type | Valid Bit |
|  |  |  |  |  |  |
|  |  |  |  |  |  |
|  |  |  |  |  |  |
|  |  |  |  |  |  |

ADVANCED LOAD ADDRESS TABLE ENTRY INVALIDATION BASED ON REGISTER ADDRESS WRAPAROUND

CROSS-REFERENCE TO RELATED APPLICATIONS

This application is related to commonly assigned U.S. patent applications Ser. No. 09/168,040, filed Oct. 7, 1998, now abandoned, entitled "METHOD AND APPARATUS FOR OPTIMIZING INSTRUCTION EXECUTION," and Ser. No. 09/521,160, filed Mar. 8, 2000, now U.S. Pat. No. 6,505,296 entitled "EMULATED BRANCH EFFECTED BY TRAMPOLINE MECHANISM," which are herein incorporated by reference. Patent application Ser. No. 09/051,160 is a Continuation-in-Part of patent application Ser. No. 09/168,040, which is a Continuation-in-Part of U.S. patent application Ser. No. 08/953,836, now abandoned, filed Oct. 13, 1997. This application is also related to U.S. patent applications Ser. No. 08/940,167, filed Sep. 30, 1997, now U.S. Pat. No. 6,094,713, entitled "METHOD AND APPARATUS FOR DETECTING ADDRESS RANGE OVERLAPS," and Ser. No. 09/476,607, filed Dec. 31, 1999, entitled, "METHOD AND APPARATUS FOR ADVANCING LOAD OPERATIONS."

THE FIELD OF THE INVENTION

The present invention generally relates to execution of instructions and performance optimization in computer systems, and more particularly to an advanced load address table (ALAT) for recording memory addresses and register targets for load instructions advanced out of order to achieve improved performance, where entries in the ALAT are invalidated based on register address wraparound.

BACKGROUND OF THE INVENTION

Computer systems include at least one processor and memory. The memory stores program instructions, data, and an operating system. The program instructions can include a compiler for compiling application programs. The operating system controls the processor and the memory for system operations and for executing the program instructions.

A "basic block" is a contiguous set of instructions bounded by branches and/or branch targets, containing no branches or branch targets. This implies that if any instruction in a basic block is executed, all instructions in the basic block will be executed, i.e., the instructions contained within any basic block are executed on an all-or-nothing basis. The instructions within a basic block are enabled for execution when control is passed to the basic block by an earlier branch targeting the basic block ("targeting" as used here includes both explicit targeting via a taken branch as well as implicit targeting via a not taken branch). The forgoing implies that if control is passed to a basic block, then all instructions in the basic block must be executed; if control is not passed to the basic block, then no instructions in the basic block are executed.

The act of executing, or specifying the execution of, an instruction before control has been passed to the instruction is called "speculation." Speculation performed by the processor at program runtime is called "dynamic speculation" while speculation specified by the compiler is called "static speculation." Dynamic speculation is known in the prior art. While the vast majority of the prior art is not based on, and does not refer to, static speculation, recently some references to static speculation have begun to surface.

Two instructions are called "independent" when one does not require the result of the other; when one instruction does require the result of the other the instructions are called "dependent." Independent instructions may be executed in parallel while dependent instructions must be executed in serial fashion. Program performance is improved by identifying independent instructions and executing as many of them in parallel as possible. Experience indicates that more independent instructions can be found by searching across multiple basic blocks than can be found by searching only within individual basic blocks. However, simultaneously executing instructions from multiple basic blocks requires speculation.

Identifying and scheduling independent instructions, and thereby increasing performance, is one of the primary tasks of compilers and processors. The trend in compiler and processor design has been to increase the scope of the search for independent instructions in each successive generation. In prior art instruction sets, an instruction that may generate an exception cannot be speculated by the compiler since, if the instruction causes an exception, the program may exhibit erroneous behavior. This restricts the useful scope of the compiler's search for independent instructions and makes it necessary for speculation to be performed at program runtime by the processor via dynamic speculation. However, dynamic speculation entails a significant amount of hardware complexity that increases exponentially with the number of basic blocks over which dynamic speculation is applied—this places a practical limit on the scope of dynamic speculation. By contrast, the scope over which the compiler can search for independent instructions is much larger—potentially the entire program. Furthermore, once the compiler has been designed to perform static speculation across a single basic block boundary, very little additional complexity is incurred by statically speculating across several basic block boundaries.

There is a need for a mechanism to achieve higher performance in computer systems by enabling execution of as many independent instructions in parallel as possible. This is desirable even when there is a possibility that a second instruction, as well as a calculation dependent thereon, may operate upon data that can be dependent upon the execution of a first instruction.

Many computer systems implement software-controlled register renaming. When a caller procedure calls a callee procedure, local registers of the caller procedure are automatically saved. The caller procedure typically only provides the callee procedure with registers containing input parameters. The callee procedure allocates more registers if the callee procedure requires its own local registers. On a return back to the caller procedure, the local registers of the caller procedure are automatically restored.

The software-controlled register renaming is typically over a large pool of physical registers. On a call, a rename base pointer (i.e., bottom of frame) is incremented by a number of the caller procedure's local registers. On a return, the rename base pointer is decremented by the number of the caller procedure's local registers.

When a series of calls are performed and the number of available physical registers are exhausted, the software-controlled register renaming simply wraps around the bottom of the physical registers. When more physical registers are requested than are available, register values are spilled into memory. Thus, the software-visible frame of registers is mapped onto the physical registers. The physical registers are conceptually arranged in a circle, and as calls are performed, the software-visible frame of registers advances around the conceptual circle of physical registers.

There is a need for a mechanism in computer systems which maximizes the number of independent instructions executed in parallel even when there is a possibility that a second instruction, as well as a calculation dependent thereon, may operate upon data that can be dependent upon execution of a first instruction. In addition, it is desirable that such a mechanism be fully and efficiently compatible with the above-described software-controlled register renaming mechanism.

SUMMARY OF THE INVENTION

The present invention provides a method and a computer system including memory storing a compiled program. The complied program including a store instruction, a load instruction scheduled before the store instruction, and a check instruction. A processor executes the compiled program. Physical registers hold data for the compiled program. A portion of the physical registers form a register stack which wraps around when full. An N-bit current wraparound count state tracks physical register remapping events which cause the register stack to wraparound or unwrap. An advanced load address table (ALAT) has entries corresponding to load instructions. Each entry in the ALAT has at least one memory range field defining a range of memory locations accessed by a corresponding load instruction, a physical register number field corresponding to a physical register accessed in the corresponding load instruction, and an N-bit register wraparound field which corresponds to the N-bit current wraparound count state for the corresponding load instruction. The check instruction accesses the ALAT to determine whether the store instruction and the load instruction potentially accessed a common memory location.

In one embodiment, after the execution of the store instruction, an absence of an entry corresponding to the load instruction in the ALAT indicates that a common memory location may have been accessed by the store and load instructions. In one embodiment, the execution of the store instruction clears the entry in the ALAT corresponding to the load instruction if the store instruction and the load instruction accessed a common memory location. In one embodiment, the execution of the store instruction clears the entry in the ALAT corresponding to the load instruction if the store instruction and the load instruction accessed a common range of memory.

In one embodiment, the N-bit current wraparound count state is incremented in response to a call remapping event which causes the register stack to wraparound. The processor then searches the ALAT for entries which have a wraparound count value in their register wraparound field matching the updated N-bit current wraparound count state and clears all entries in the ALAT which have the matching wraparound count value in their register wraparound field. Similarly, the N-bit register current wraparound count state is decremented in response to a return remapping event which causes the register stack to unwrap, and the processor then searches the ALAT for entries which have a wraparound count value in their register wraparound field matching the updated N-bit current wraparound count state and clears all entries in the ALAT which have the matching wraparound count value in their register wraparound field.

In one embodiment, the N-bit register wraparound field augments the physical register number field to form an extended physical register number for the corresponding load instruction. In one embodiment, the at least one memory range field includes a memory address field and a memory access size field. In one embodiment, each entry in the ALAT further includes a register type field indicating a type of physical register accessed in the load instruction. For example, the type of physical registers that are accessible in the load instruction can include general registers and floating-point registers. In one embodiment, each entry in the ALAT further includes a valid bit field which indicates whether the entry is valid.

In one embodiment, the compiled program includes recovery code to which control is passed when the check instruction determines that the store instruction and the load instruction may have accessed a common memory location during execution of the program. The recovery code includes code for re-execution of the load instruction.

In one embodiment, the compiled program includes at least one calculation instruction that is dependent on data read by the load instruction, where the at least one calculation instruction being scheduled ahead of the store instruction. In this embodiment, the compiled program also includes recovery code to which control is passed when the check instruction determines that the store instruction and the load instruction may have accessed a common memory location during execution of the program. The recovery code includes code for re-execution of the load instruction and the at least one calculation instruction.

The computer system according to the present invention efficiently combines the ALAT mechanism for implementing advanced loads and the register stack mechanism implemented with software-controlled renaming of registers by allowing the ALAT according to the present invention to record the physical register number used in the advanced load without incurring excessive advanced load recovery costs because entries in the ALAT are invalidated based on register address wraparound.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment of the present invention is directed to an advanced load address table (ALAT) for recording memory addresses and register targets for load instructions advanced out of order to achieve improved performance. The ALAT according to the present invention efficiently interacts with software-controlled renaming of registers to allow the ALAT to record physical register numbers without incurring excessive advanced load recovery costs by invalidating entries in the ALAT according to the present invention based on register address wraparound. These aspects of the present invention can be employed with any type of computer system. An example of such a computer system is a general purpose computer system 50 illustrated in FIG. 1. General purpose computer system 50 includes a processor 52, an input device 54, an output device 56, and memory 58 connected together through a bus 60. Memory 58 includes primary memory 62 (i.e., fast volatile memory such as a dynamic semiconductor memory) and secondary memory 64 (i.e., nonvolatile memory such as flash memory and magnetic disks). Memory 58 stores one or more programs 66 executed on the processor 52. An operating system (OS) 68 is stored in memory 58 and controls processor 52 and memory 58 for system operations and for executing programs 66 stored in memory 58.

Programs 66, when executed by processor 52, control general purpose computer system 50. Programs 66 may include a compiler, the function of which is described below in connection with FIG. 8.

Figure 1:
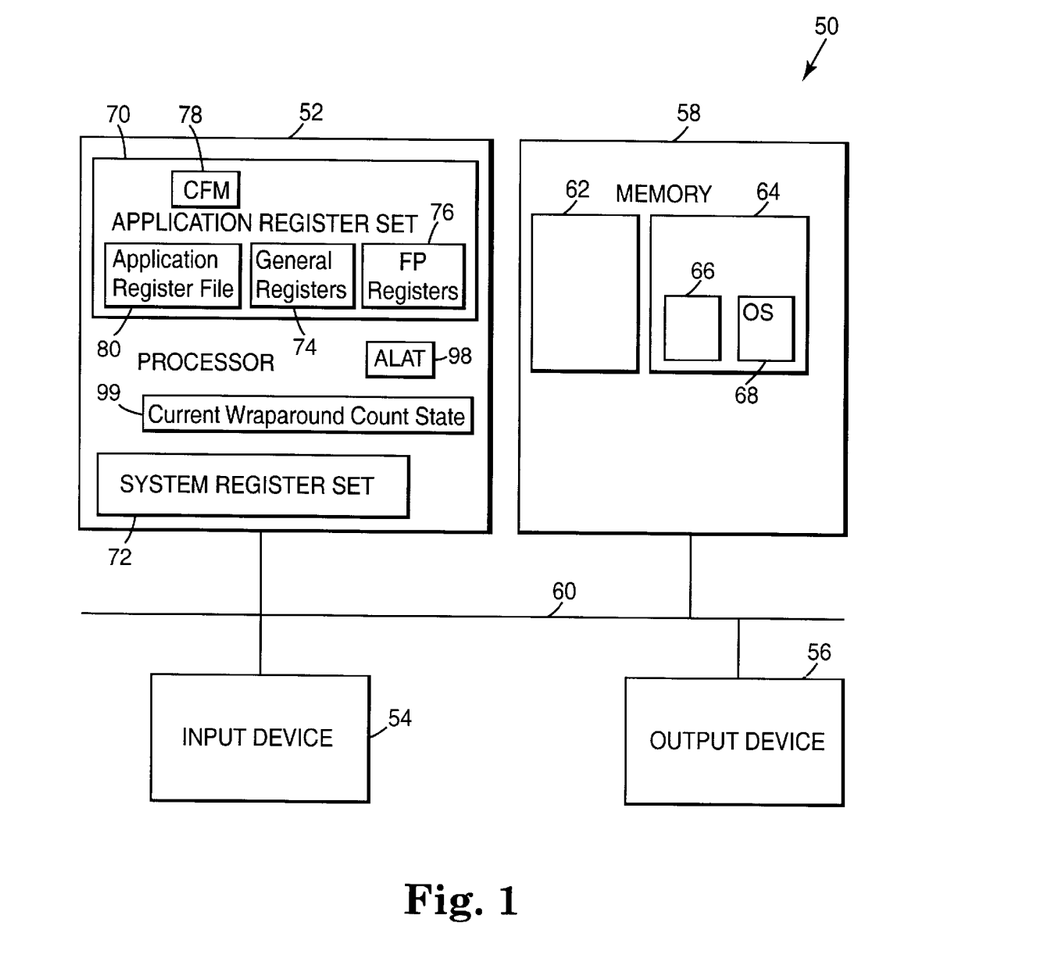
FIG. 1 is a block diagram of a general purpose computer system on which embodiments of the present invention can be implemented.

Processor 52 includes an application register set 70 and a system register set 72. An architectural state of computer system 50 is represented by application register set 70, system register set 72, and memory 58. Application register set 70 includes registers available to application programs stored in memory 58. System register set 72 provides system register resources for process control, interruption handling, protection, debugging, performance monitoring, and the like. System register set 72 is generally only visible to operating system 68.

In one embodiment, application register set 70 specifically includes general registers 74, floating-point (FP) registers 76, a current frame marker (CFM) 78, and an application register file 80. Other example registers which can be included in application register set 70 include compare result registers, branching information registers, an instruction pointer, process identifiers, and a user mask.

Example registers which can be included in system register set 72 include region registers, protection key registers, debug break point registers, machine specific registers, a processor status register, a translation look-aside buffer (TLB), and control registers.

Figure 2:
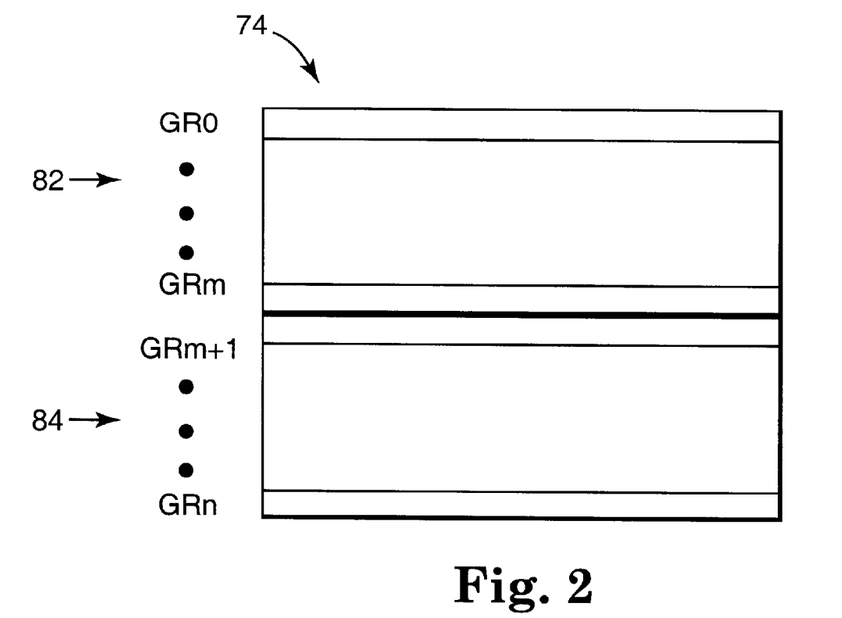
FIG. 2 is a diagram of one embodiment of general registers of the general purpose computer system of FIG. 1.

One embodiment of general registers 74 is illustrated generally in FIG. 2. In one embodiment, general registers 74 provide a central resource for integer and integer multimedia computations. General registers 74 are partitioned into static general registers 82 including general registers GR0 through GRm and stacked general registers 84 including general registers GRm+1 through GRn. Static general registers 82 are typically visible to all procedures. Stacked general registers 84 are typically local to each procedure and may vary in size from zero to (n–m) general registers. A register stack mechanism in computer system 50 is implemented by software-controlled register renaming of addresses as a side-effect of procedure calls and returns. The register stack mechanism is not otherwise visible to application programs. The static general registers 82 must be saved and restored at procedure boundaries according to software convention. The stacked general registers 84 are automatically saved and restored by a register stack engine without explicit software intervention. In one embodiment, a portion of stacked general registers 84 can be programmatically renamed to accelerate loops.

Figure 3:
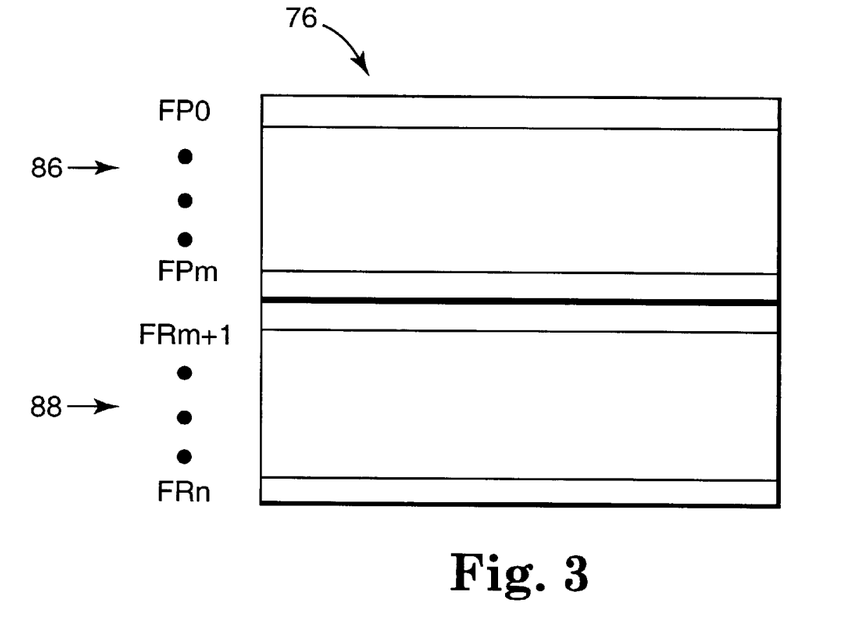
FIG. 3 is a diagram of one embodiment of floating-point registers of the general purpose computer system of FIG. 1.

One embodiment of floating-point registers 76 is illustrated generally in FIG. 3. Floating-point registers 76 are employed for floating-point computations. Floating-point registers 76 are partitioned into static floating-point registers 86 including floating-point registers FP0 through FPm and rotating floating-point registers 88 including FPm+1 through FPn. In one embodiment, static floating-point registers 86 include floating-point and multimedia registers. In one embodiment, rotating floating-point registers 88 can be programmatically renamed to accelerate loops.

Figure 4:
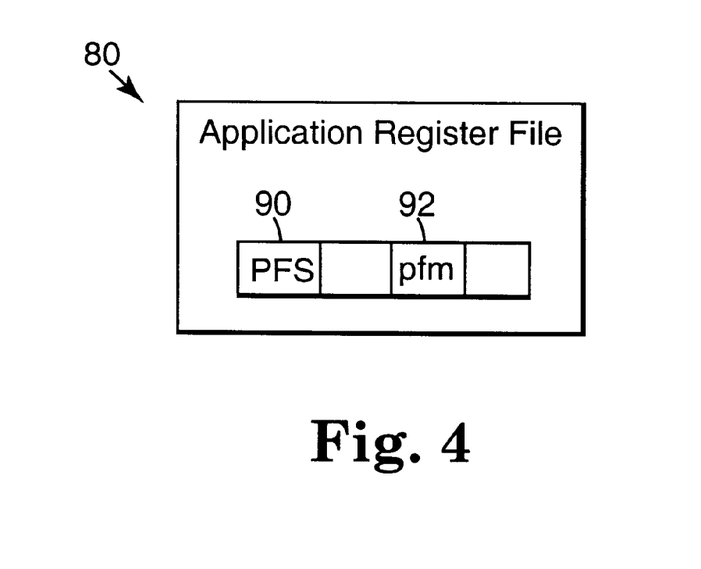
FIG. 4 is a diagram of one embodiment of an application register file of the general purpose computer system of FIG. 1.

One embodiment of application register file 80 is illustrated generally in FIG. 4. Application register file 80 includes special purpose data registers and control registers for application-visible processor functions for application instructions. Application register file 80 specifically includes a previous function state (PFS) register 90 having multiple fields which represent values copied automatically on a call instruction from CFM 78 to accelerate procedure calling. For example, execution of a call instruction includes storing the return address and other state information, such as storing the current frame marker of CFM 78 in a previous frame marker field (PFS.pfin) 92 of PFS register 90.

Stacked general registers 84 are made available to a program in memory 58 by allocating a register stack frame comprising a programmable number of local and output registers of stacked general registers 84 which are visible to a given procedure. Each register stack frame is associated with a frame marker. The frame marker describes a state of stacked general registers 84. CFM 78 holds the state of the current register stack frame for the currently active procedure.

Figure 5:
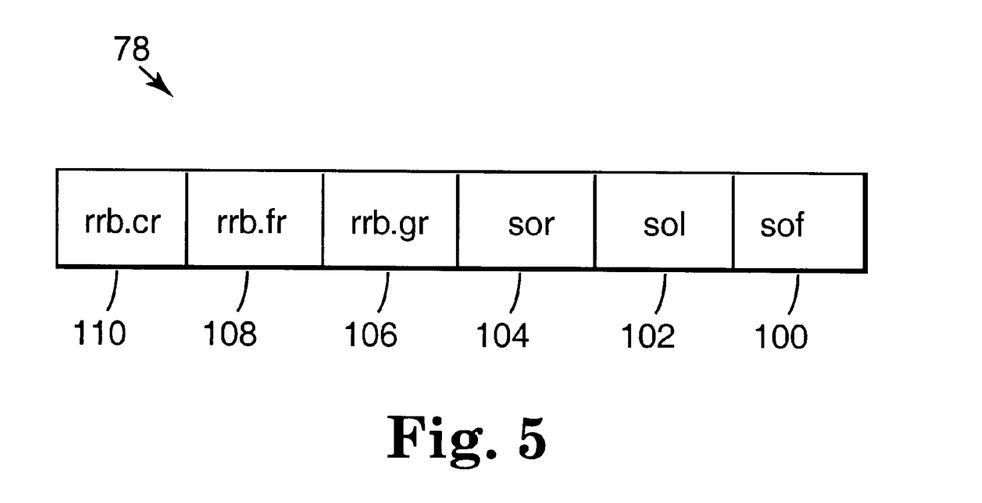
FIG. 5 is a diagram of one embodiment of a current frame marker of the general purpose computer system of FIG. 1.

The frame markers contain the sizes of various portions of the register stack frame and register rename base values used in register rotation. The frame marker format of CFM 78 is illustrated in FIG. 5. In the embodiment illustrated in FIG. 5, the frame marker format includes a size of stack frame field (CFM.sof) 100, a size of locals portion of stack frame field (CFM.sol) 102, a size of rotating portion of stack frame field (CFM.sor) 104, a register rename base for general registers field (CFM.rrb.gr) 106; a register rename base for floating-point registers field (CFM.rrb.fr) 108; and a register rename base for compare result registers field (CFM.rrb.cr) 110.

On a call, the current frame marker in CFM 78 is saved as the previous frame marker in PFS.pfrn field 92. On a call, a new value is written to CFM 78, creating a new register stack frame with no locals or rotating registers, but with a set of output registers which are the caller procedure's output registers. In addition, on a call register rename base fields 106, 108, and 110 are set to zero. On a return, CFM 78 is restored with the previous frame marker in PFS.pfrn field 92.

The operation of the register stack mechanism of computer system 50 for making stacked general registers 84 available to the currently active procedure is as follows. The register stack frame is partitioned into two variable-size areas including a local area and an output area. Immediately after a call, the size of the local area of the newly activated register stack frame is zero and the size of the output area of the newly activated resistor stack frame is equal to the size of the caller procedure's output area and overlays the caller procedure's output area. In one embodiment, a special allocation instruction is employed to dynamically resize the local and output areas of the current register stack frame by specifying immediate values used to determine the size of frame value of CFM.sof field 100 and the size of locals portion of stack frame value of CFM.sol field 102. The value of CFM.sof field 100 specifies the size of the entire register stack frame visible to the current procedure. The value of the CFM.sol field 102 specifies the size of the local area of the current register stack frame. The size of the output area of the current register stack frame is determined by the difference between the value of CFM.sof field 100 and the value of CFM.sol field 102. In one embodiment, reading a stacked register outside of the current register stack frame returns an undefined result and writing a stacked register outside of the current register stack frame causes an illegal operation fault.

When a call is executed, a copy of the current frame marker in CFM 78 is saved as the previous frame marker in PFS.pfm field 92 and the callee procedure's register stack frame is created as follows. Stacked general registers 84 are renamed such that the first register in the caller procedure's output area becomes GRm+1 for the callee procedure. The size of the local area is set to zero for the callee procedure. The size of the callee procedure's register stack frame, as indicated by the updated callee CFM.sof field 100, is set to the size of the caller procedure's output area prior to the call instruction (i.e., caller CFM.sof–caller CFM.sol).

In one embodiment, values in the output area of the caller procedure's register stack frame are visible to the callee procedure, which permits parameter and return value passing between procedures to take place entirely in registers. In one embodiment, procedure register stack frames are dynamically re-sized by issuing a special allocation instruction which causes no renaming of registers, but does change the size of the register stack frame and the partitioning between local and output areas of the register stack frame. When a return instruction is executed, CFM 78 is restored with the previous frame marker in PFS.pfm field 92 and the register renaming is restored to the caller procedure's configuration.

It should be appreciated that the above described computer system 50 of FIG. 1 is provided merely for illustrative purposes, and that the embodiments of the present invention described below can be implemented on computer systems of numerous other types and configurations.

In one embodiment, computer system 50 can recover from problems encountered during execution of statically speculated instructions. One embodiment of computer system 50 can execute an instruction segment that has been scheduled by a compiler to be speculatively executed, verify the integrity of the execution of the instructions that were speculatively executed, and execute recovery code to correct problems, if any problems are detected.

Instructions are divided into two classes: speculative and non-speculative. At the start of compilation all instructions are initialized to be non-speculative. When, during the course of scheduling, the compiler schedules an instruction outside of the instruction's originating basic block, the compiler marks the instruction as being speculative. Non-speculative instructions that encounter an exceptional condition generate an exception. Speculative instructions that encounter an exceptional condition do not generate an exception but rather write a "deferred exception token" (DET) into their destination. The existence of the exceptional condition prevents a specified computation instruction from being completed with the proper operands and therefore the destination of the instruction includes the DET rather than the correct result. A non-speculative instruction that reads a DET generates an exception. A speculative instruction that reads a DET writes another DET into the instruction's destination (note again that the destination does not contain the correct result)—this behavior is called "propagation." By placing a non-speculative instruction into the originating basic block of a particular speculative instruction, and by configuring the non-speculative instruction to read a destination of the speculative instruction (or any location into which a DET may have been propagated), a DET generated by the speculative instruction can be detected at the point at which control is passed to the originating basic block. At this point it is necessary to re-create the exceptional condition that caused the original creation of the DET, and to replace all previously propagated DET's with the correct results. This is achieved by a process called "recovery." Recovery can involve augmenting the program with additional code generated by the compiler; the code is a copy of the set of dependent speculative instructions in non-speculative form such that, upon execution, all exceptional conditions generate exceptions and all previously written destinations are overwritten with the correct results. The recovery code need not be an exact copy of the instruction sequence, but may be code that, when executed, achieves the same result. Furthermore, in one embodiment, a new instruction is defined with the specific purpose of checking for the existence of DET's and activating the associated recovery code in the event a DET is detected.

The above-discussed embodiment does not depend on the exact form of the DET. Also, alternative embodiments for specifying speculative and non-speculative instructions are possible. For example, some instructions may be defined to behave speculatively independent of whether the instructions were scheduled outside of their originating basic block.

The speculation referred to up to this point is called "control speculation" since instructions are executed before control is passed to them. Speculation can take other forms besides control speculation. One example of this is "data speculation" whereby a mechanism according to the present invention is defined that allows instruction A, which may be dependent on instruction B, to be executed before instruction B. Although data speculation can apply to any class of instruction, loads and stores are discussed below to demonstrate data speculation according to the present invention. A load that is below a store generally cannot be scheduled above the store unless it can be shown that the address read by the load is never equal to the address written by the store. If the addresses are equal then the load should receive the results of the store. However, if it can be shown that the address read by the load is never equal to the address written by the store, then the load can be safely scheduled above the store. Data speculation occurs when the compiler schedules the load above the store when it cannot be proven that the addresses being accessed by both will never be equal. When the addresses accessed by both instructions are determined to be equal at runtime, an error condition known as a collision occurs. In the event of a collision, a recovery mechanism may be employed to correct any incorrectly written destinations. In one embodiment of the present invention, a load instruction and one or more instructions dependent thereon are scheduled by the compiler above a store instruction, even if the compiler determines there may be a collision between the two instructions.

One aspect of the present invention relates to a method and apparatus for advancing an instruction out of order. This includes scheduling a second instruction (e.g., a load instruction), as well as possibly an entire calculation dependent thereon, to be executed in advance of a first instruction (e.g., a store instruction) which may produce an error condition known as a collision, due to the first and second instructions accessing the same address in a portion of a memory.

To implement some aspects of the present invention, a computer architecture can be defined that allows a compiler to schedule instructions outside of their originating basic block (control speculation), and schedule parallel execution of instructions that may potentially access the same memory location (data speculation), and therefore are potentially dependent. One example of such a computer architecture is described in greater detail in the Ross et al., U.S. Pat. No. 5,915,117, entitled "COMPUTER ARCHITECTURE FOR THE DEFERRAL OF EXCEPTIONS ON SPECULATIVE INSTRUCTIONS," which is herein incorporated by reference. While the aspects of the present invention are described below with respect to this architecture, the present invention is not limited to use with this architecture, and may be realized using other architectural features, as will be described in greater detail below.

This new architecture defines a set of "speculative" instructions that do not immediately signal an exception when an exceptional condition occurs. Instead, a speculative instruction defers an exception by writing a "deferred exception token" (DET) into the destination specified by the instruction. The instruction set also contains "non-speculative" instructions that immediately signal an exception when an exceptional condition occurs, as is common of conventional instructions.

Instruction exceptions are well known in the art, and include, but are not limited to, exceptions such as page faults, illegal operands, privilege violations, divide-by-zero operations, overflows, and the like. The new architecture also provides a new type of memory speculation wherein a load instruction that follows a store instruction in the logical order defined by a programmer may be executed before the store instruction based on the speculation that the two instructions will not access the same memory location. In one embodiment of the present invention, a memory speculation check accesses an advanced load address table (ALAT), such as ALAT 98 in processor 52, that contains a record of recent speculative memory accesses, to determine if the speculation is correct. If the speculation is correct, the instructions were properly executed. If not, the load instruction, and any instructions that are dependent on the load and were scheduled above the store, are executed again to retrieve the contents written by the store instruction.

Using instructions marked as speculative, a compiler may schedule instructions outside of their originating basic block, and may schedule possibly dependent memory accesses in parallel. As stated above, when a speculative instruction generates an exception, a "deferred exception token" may be written into the destination specified by the instruction. Any speculative instruction that detects a DET in any source copies the DET into its destination. Note that when a speculative instruction finds a DET in a source, it need not perform the function associated with the instruction. The instruction can simply copy the DET to the destination. In this manner, the DET propagates through the block of speculative instructions. Thus, in one embodiment, a destination which would include the result of a calculation may be checked for a DET, without checking each operand used in the calculation.

Any non-speculative instruction that detects a DET in a source may generate an immediate exception. Accordingly, DET's propagate through speculative instructions in data-flow fashion until (and if) they reach a non-speculative instruction.

If a program determines at runtime that the speculation upon which instructions were executed was incorrect (for example, a branch that was incorrectly predicted), the program may simply ignore the DET's since the DET's are not accessed by the program. However, if the speculation was correct, DET's are converted into an actual exception if, and when, the originating basic block of the instruction that created the DET is executed. In one embodiment, this conversion is performed by an instruction called the "speculation check" instruction, or "chk.s" for short. The chk.s instruction reads a source, and if the source contains a DET, branches to a specified target address that implements recovery code. Similarly, in one embodiment of the present invention, the correctness of memory speculation may be determined by an "advance check" instruction, called a chk.a instruction. The chk.a instruction determines whether a memory location was accessed out-of-order, and if it was, the chk.a instruction branches to a specified target address that implements recovery code. The chk.a instruction will be discussed in greater detail below. Chk.s and chk.a may each be implemented in a number of ways which result in a change in the control flow of the instructions being executed. For example, each can be implemented as a conditional branch instruction. In one embodiment, the chk.s instruction and/or the chk.a instruction can be implemented as an instruction, such as a trampoline check instruction, that generates an exception that invokes an exception handler, to effect control flow change with a trampoline mechanism, such as the trampoline mechanism described in detail in the above-incorporated patent application Ser. No. 09/521,160, filed Mar. 8, 2000, entitled "EMULATED BRANCH EFFECTED BY TRAMPOLINE MECHANISM."

By definition, the chk.s and chk.a instructions are always non-speculative. Generally, if these instructions detect a DET or an incorrect memory speculation, recovery code is executed that includes non-speculative versions of the offending instructions. With respect to a chk.s instruction that detects a DET, upon execution of the recovery code, the non-speculative version of the offending instruction will replace the DET in its destination with the correct result and/or generate the exception. If any later speculative instructions were dependent on the offending instruction, they are also included in the recovery code to be re-executed because the DET's were propagated into the later speculative instruction's destinations, and therefore these destinations may contain incorrect results. With respect to a chk.a instruction, the recovery code must re-execute the offending load instruction to load the proper contents from memory. In addition, any instructions dependent on the offending load instruction that were scheduled above the store on which the load depends are also re-executed. Scheduling of load instructions and calculation instructions dependent on the loaded value above the store instruction will be discussed further below. Any instructions not dependent on the offending instruction are not re-executed since this is not necessary and since some of them would incorrectly modify the program state if re-executed. Since the compiler scheduled the speculative instructions and the speculation checks, the compiler will be able to generate recovery code appropriate for a particular set of speculative instructions.

One aspect of the present invention may be realized by a computer system having a compiler capable of scheduling instructions for speculative execution and generating appropriate recovery code, and an architecture capable of executing instructions marked as speculative, such as a computer system that implements the architecture described above.

Figure 6:
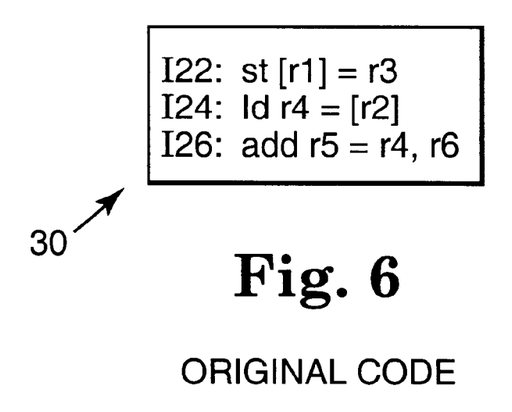
FIG. 6 depicts an original code sequence including a memory store instruction followed by a memory load instruction.
Figure 7:
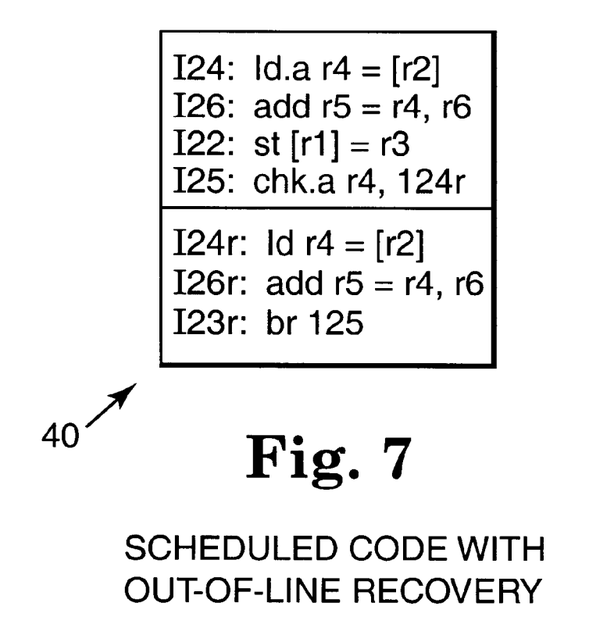
FIG. 7 depicts a scheduled code sequence resulting from scheduling the original code sequence of FIG. 6 using static data speculation to advance the load instruction according to one embodiment of the present invention.
Figure 8:
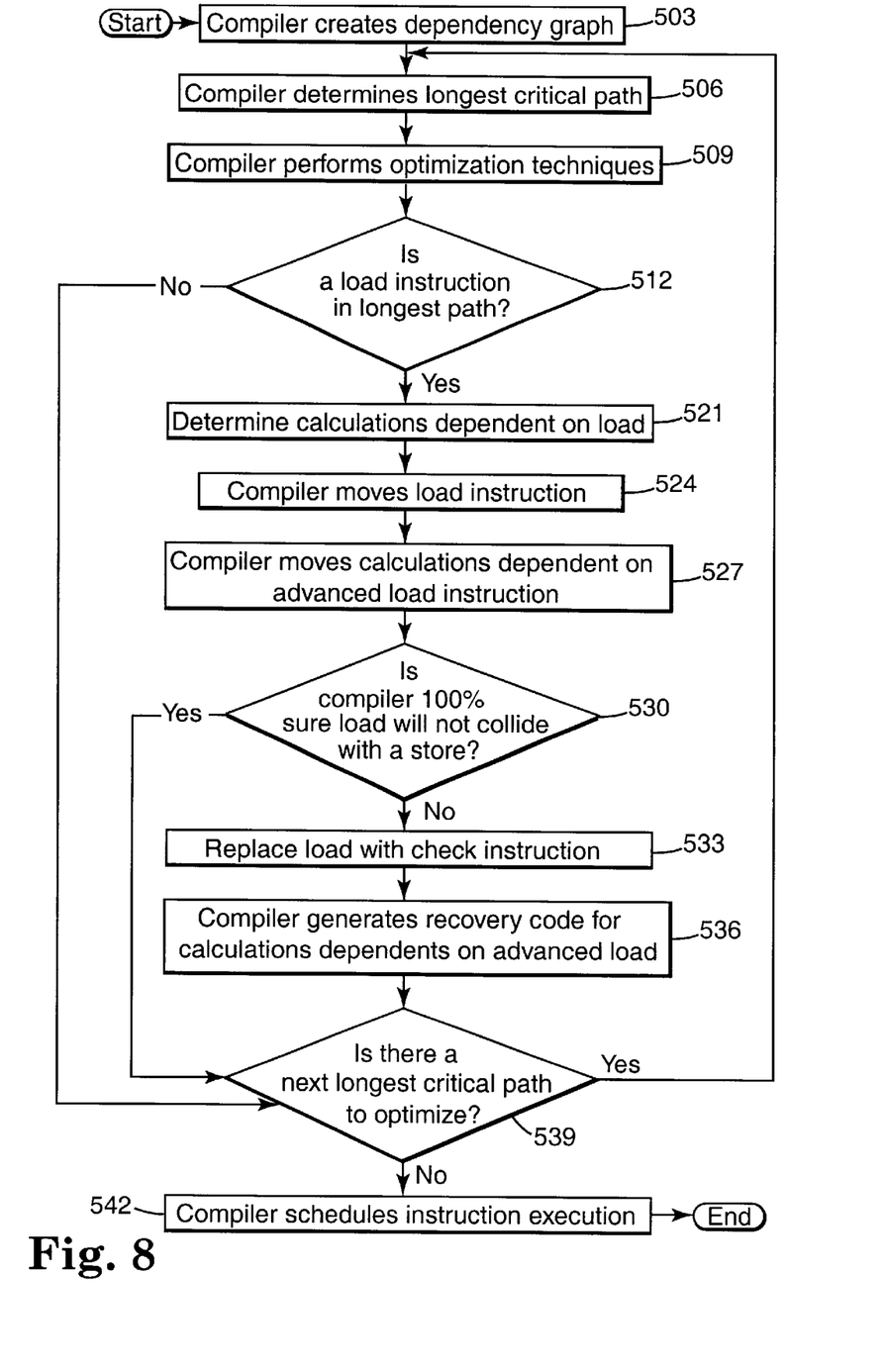
FIG. 8 is a flowchart of a process for advancing a load instruction and instructions dependent thereon ahead of a store instruction according to one embodiment of the present invention.

In one embodiment of the present invention, load instructions that are advanced out of turn ahead of store instructions are used to illustrate data speculation and are described in reference to FIGS. 6–8. As used herein, the references to load and store instructions respectively indicate any instructions that perform reads and writes to memory, irrespective of whether the instructions perform other functions. Load instructions typically require longer amounts of time to execute than other instructions, due to memory latency. By moving a load instruction earlier in the execution of a program, efficiency of executing instructions in a computer is improved. The load, referred to as an advanced load, allows an increase in the parallelism of activities being performed that require use of the memory.

As discussed briefly above, often a compiler cannot detect with one hundred percent certainty whether a load instruction and a store instruction will collide (i.e., access a common memory location). This presents a barrier to achieving parallelism in that it forces a more conservative instruction schedule that will not overlap the load latency, i.e., will not move a load ahead of a store with which it might collide. However, in a large percentage of these cases, the load and store instructions do not in fact collide. Thus, one embodiment of the present invention allows a load instruction and calculations dependent thereon to be executed before a potentially colliding store instruction as one means of improving parallelism of program execution in a single or multiple processor system.

Consider the simple original code 30 shown in FIG. 6. Code 30 includes: instruction I22, which stores the contents of register r3 into a memory location indexed by the contents of register r1; instruction I24, which loads register r4 with the contents of the memory location indexed by the contents of register r2; and instruction I26 which adds registers r4 and r6 and writes the result into register r5. Assume, that when the compiler schedules code 30, it determines that it is unlikely, but not impossible, that the contents of register r1 will be the same as the contents of register r2 when instructions I22 and I24 are executed. Further, assume that the compiler determines that it would be more efficient to schedule instructions I24 and I26 before (or in parallel with) instruction I22. With respect to scheduling instructions in parallel, it should be appreciated that even in a single processor system, the single processor will typically include multiple execution units on which multiple instructions can be executed in parallel.

FIG. 7 shows scheduled code 40, which was produced when the compiler scheduled original code 30 of FIG. 6, in accordance with one embodiment of the present invention. Code 40 includes instructions I24 and I26 scheduled before instruction I22 (the store instruction). Note that ".a" (indicating an advanced instruction) has been appended to the load instruction, indicating that this load instruction records the load address in the ALAT 98. Instruction I25 is a chk.a instruction that checks ALAT 98 to determine whether the load (I24) and store (I22) instructions accessed the same memory location. If the contents of registers r1 and r2 were not equal, the instructions did not access the same memory location, and chk.a (I25) takes no action. However, if the contents of registers r1 and r2 were equal, the chk.a instruction (I25) detects a data speculation error and branches to the recovery code starting at instruction I24r. Instruction I24r re-executes the load instruction, causing the proper results to be loaded into register r4 since the load instruction is re-executed after the store instruction (I22). Instruction I26r re-executes the add instruction which writes the correct result into register r5 and instruction I23r branches back to instruction I25, which verifies that there is no data speculation error.

FIG. 8 is a flowchart illustrating one exemplary routine that may be implemented by a compiler to generate the scheduled code changes shown in FIG. 7. This flowchart is provided merely as an example, as other implementations are possible. The present invention is not limited to use with a specific program language or computer configuration, and may be applied to a compiler used in a single or multiple processor system.

The process of FIG. 8 begins in step 503 when the compiler creates a conventional dependency graph representing instructions in a source computer program which has not yet been scheduled by the compiler. The present invention is not limited to any particular type of graph. The dependency graph may take several forms, including a diagram with at least one path representing a segment of the source computer program and a node representing each instruction in the segment of the computer program. The dependency graph for each program typically includes a plurality of paths, each with a plurality of nodes. A node representing an instruction may be annotated with information related to the instruction, such as the number of clock cycles needed to execute the instruction. Typically, arcs connecting nodes in the diagram indicate a dependency between instructions.

In step 506, the compiler reviews the graph and determines which path of the graph includes a sequence of instructions that results in a longest total execution time from start to finish.

In step 509, the compiler attempts to optimize the execution of the longest path in the program, since the longest path represents the critical portion in the program that limits the runtime of the instruction sequence. Conventional optimization techniques may be used by the compiler, and further optimization techniques are described below as they relate to an advanced load and its dependent calculations.

As mentioned above, one way the compiler can optimize the longest critical path is through data speculation. In one embodiment of the present invention, this may include moving an instruction, such as a load instruction which includes a read operation, earlier in the execution of the program before a store instruction which includes a write operation. In step 512, the compiler determines if a load instruction is in the longest critical path. If a load is included in the longest path, the compiler may advance the load and instructions dependent thereon as one method of optimization, as discussed further below.

When a load instruction is found in a path to be shortened, the compiler next determines, in step 521, which calculation instructions are dependent on the data read by the load instruction. The calculations are dependent if they require the use of the value resulting from the completion of the load instruction.

In step 524, the load instruction is removed from its place in the scheduled instruction sequence. In step 527, the calculations dependent on the load (identified in step 521) are advanced to follow the load instruction, such that both the load instruction and calculations dependent on the load instruction are advanced to allow optimization of the instruction sequence. The compiler advances the load instruction labeled "ld.a" ahead to a location wherein its execution may result in improved overall performance of the program.

As discussed above, a store instruction may exist in a path of the dependency graph ahead of the load instruction "ld.a", and the compiler may be unable to determine whether the load and store will collide (i.e., use the same memory location). In step 530, the compiler determines whether there is absolute certainty that the load and the store will not collide.

When it cannot be determined for certain that the load and the store in front of which it is moved will not collide, then in step 533, the load instruction which was removed in step 524 is replaced with a check instruction, such as a chk.a instruction described above in connection with FIGS. 6 and 7. The chk.a instruction replaces the load instruction and is performed (as described below) where the load would have been scheduled if it were not advanced.

In step 536, the compiler generates recovery code for the advanced load and the calculations dependent on the advanced load that were advanced in step 527. The recovery code will be called by the chk.a instruction, if necessary, as described below.

When a load instruction is not found in the longest critical path in step 512, or when it is determined at step 530 that the compiler is absolutely certain that the load has not been advanced in front of a store instruction with which it will collide (so that no check instruction or recovery code are necessary), or after the recovery code is generated in step 536, then the process continues at step 539, wherein the compiler determines if there is a longest critical path remaining which may potentially be optimized. The compiler may optimize each of the next longest paths in the program until the compiler optimizes as much of the source program as possible, thereby improving the parallelism of the execution of the source program.

When it is determined at step 539 that the compiler cannot further optimize the program, the process proceeds to step 542, wherein the compiler schedules the optimized instruction sequences for execution. However, when the compiler determines in step 539 that there is a longest critical path remaining which may potentially be optimized, the compiler identifies the next longest path, in step 506. In this manner, the process continues until all of the paths in the graph that can be optimized are optimized.

In step 542, the compiler schedules execution of the instructions to reflect any changes in execution order as carried out by the optimization procedures described above. The compiler may schedule execution of the instructions in the program in a number of ways, potentially making use of parallel execution units, and the present invention is not limited to any particular scheduling mechanism. For the example described above in FIG. 6, the resulting optimized code is shown in FIG. 7 and the recovery code is noted as instructions I24r, I26r and I23r.

Figure 9:
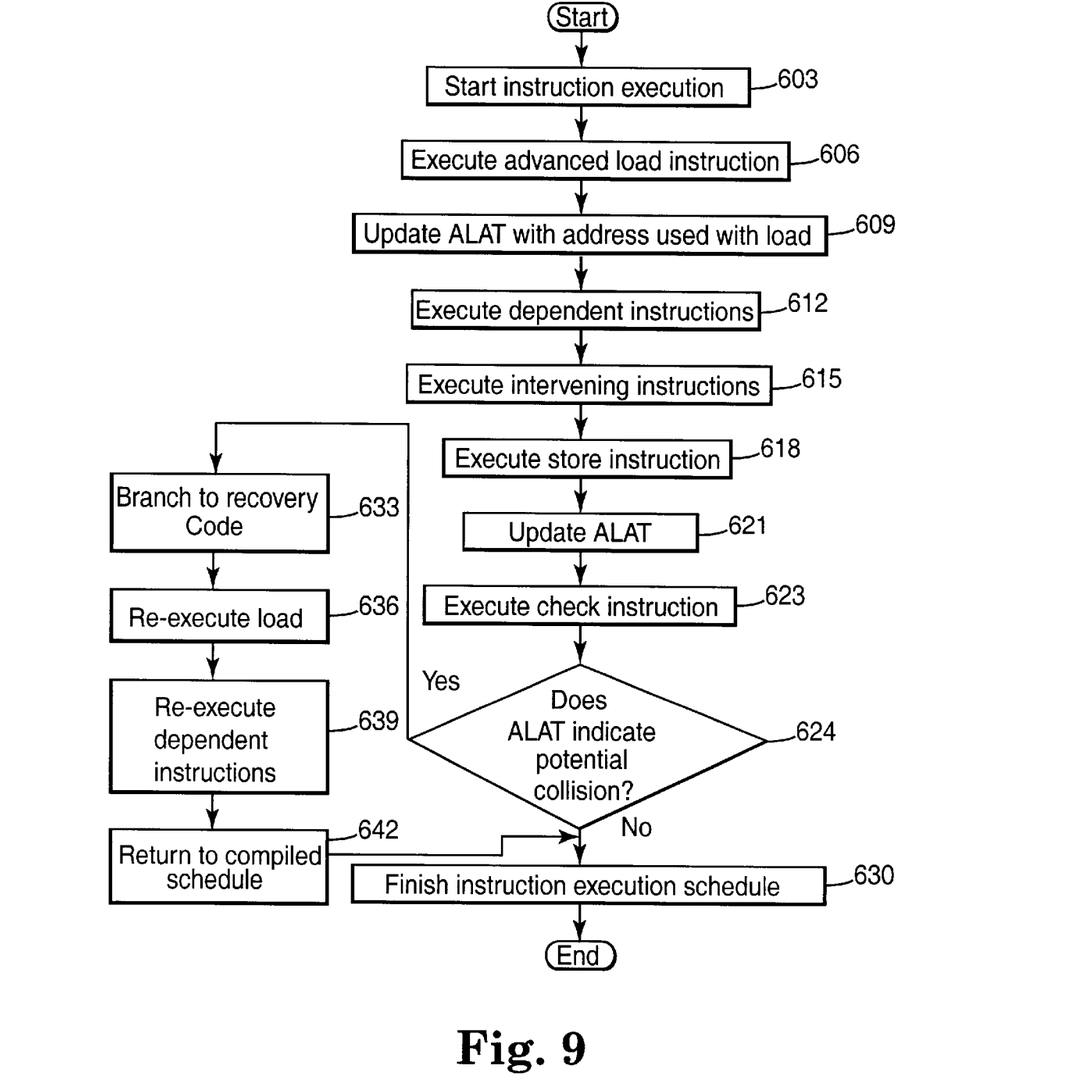
FIG. 9 depicts a flowchart of a process for executing advanced load instructions at runtime according to one embodiment of the present invention.

FIG. 9 is a flowchart illustrating a routine executed by a computer system, such as computer system 50, when executing an instruction sequence optimized through techniques, such as those described above in connection with FIG. 8, that include advancing a load instruction and dependent calculations out of order ahead of a store.

Execution of the scheduled instruction sequence is started in step 603. During the execution of the instruction sequence, the advanced load (e.g., ld.a, in FIG. 7) is executed in step 606. After the advanced load instruction has been executed, ALAT 98 is updated to record the range of memory locations read by the advanced load instruction (e.g., the address in r2) executed in step 609. An entry is made in ALAT 98 to allow a later executed store instruction, such as the store executed in step 618, to determine if the advanced load and the store instructions may have accessed a common memory location. ALAT 98 can be implemented with any suitable ALAT structure in processor 52 or in communication with processor 52 that allows the range of memory addresses of a particular advanced load and its corresponding store instruction to be compared.

Figure 10:
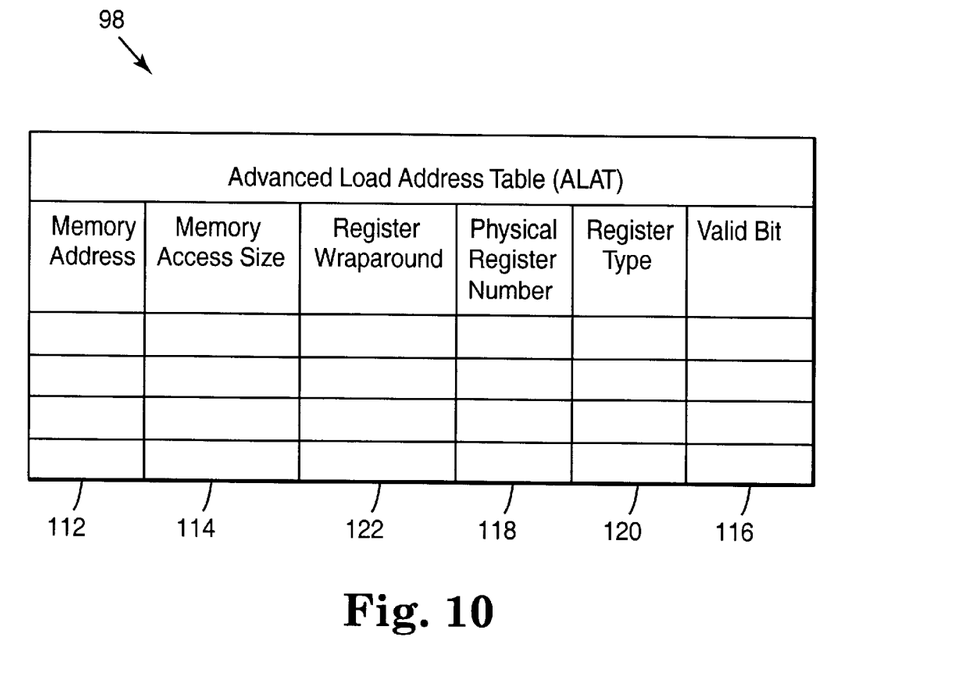
FIG. 10 depicts an example of an advanced load address table according to one embodiment of the present invention.

One embodiment of ALAT 98 according to the present invention is illustrated in FIG. 10. An entry in the ALAT includes a physical memory address field 112 and a memory access size field 114 that together define the range of memory locations accessed. The present invention is not limited to this method of defining the range of memory locations, as numerous other techniques can be employed. For example, the memory range accessed may be identified by start and end memory addresses, or by a memory end address and a range. In the embodiment illustrated in FIG. 10, ALAT 98 also includes a valid bit field 116 that is used to indicate whether the entry is valid. As discussed below, in one embodiment of the invention, there are times (e.g., context switches between two applications) when it is desirable to invalidate the entries in ALAT 98. The valid bit field 116 provides a convenient mechanism for performing such invalidation.

In one embodiment of the invention, there can simultaneously be multiple loads that each has been advanced ahead of a corresponding store. As discussed below, during program execution a technique is provided for verifying that no collision occurred between each pair of loads and stores. Thus, in one embodiment, ALAT 98 includes information that uniquely identifies the advanced load instruction to which it corresponds, so that the entry can be identified to determine a possible collision with the corresponding store instruction. This unique identification can be implemented in any number of ways, and ALAT 98 is not limited to any particular implementation. In the embodiment of ALAT 98 illustrated in FIG. 10, the entry for a particular advanced load is indexed based on a physical register number and type of register (e.g., general or floating-point) used in the advanced load instruction. The physical register number used for each instruction is assigned by the compiler, which ensures that a unique register is used for each advanced load instruction.

Thus, the embodiment of ALAT 98 illustrated in FIG. 10 includes entries which each have a physical register number field 118 corresponding to an actual physical register accessed in the advanced load instruction and a register type field 120 which indicates whether the physical register accessed in the advanced load instruction is a general or floating-point register. In addition, the physical register number field 118 for each entry in ALAT 98 is augmented with a register wraparound N-bit field 122 corresponding to an N-bit current wraparound count state 99 (shown in FIG. 1) used in the advanced load instruction to extend the physical register number for the advanced load instruction, which permits efficient invalidation of entries in ALAT 98 based on register address wraparound according to the present invention. The employment of current wraparound count state 99 and register wraparound field 122 for invalidating ALAT entries based on register wraparound is described in detail below.

Referring to FIG. 9, when the advanced load is executed in step 606 and before an entry in ALAT 98 is made, ALAT 98 is accessed using the target register number as an index and ALAT 98 is checked to determine whether an entry already exists corresponding to the target register number used by the advanced load. If there is an entry, it is removed because it includes information that is not related to the present advanced load and was most likely entered during execution of an earlier advanced load. After the existing entry is cleared of the data from the previously executed advanced load, or when an empty slot corresponding to the target register number of the present advanced load is found in ALAT 98, a new entry indexed by the target register number is made for the present advanced load instruction.

After the advanced load is executed and ALAT 98 is updated, the calculation instructions dependent on the result of the advanced load instruction (e.g., I24, I26) are executed in step 612. In the example discussed above, the dependent calculations include an add instruction I26, as illustrated in FIG. 7. Any other instructions that follow the advanced load instruction and that precede the store instruction above which the load was advanced are executed in step 615.

In step 618, the store instruction (e.g., I22) above which the load was advanced and with which the load may possibly collide is executed. In the example illustrated in FIG. 7, the store instruction I24 accesses the address in r1. In executing the store instruction I22, all of the valid entries in ALAT 98 are searched using the physical address and size of the region of memory being written by the store. This searching can be done in any number of ways, and the present invention is not limited to any particular technique. In one embodiment of the present invention, ALAT 98 is arranged as a fully associative content addressable memory so that all of the valid entries are searched simultaneously. The entries are searched to determine if a collision occurred between the store instruction and any advanced load instruction. If the range of memory space of an advanced load (e.g., I24) is found in ALAT 98 that overlaps the range of memory space for the store instruction, (e.g., I22), then a collision has occurred. In one embodiment of the invention, when a collision is detected, the entries in ALAT 98 for the addresses corresponding to the colliding advanced loads are removed in step 621, signifying the collision. In step 621, if the memory space accessed by the store instruction (e.g., I22) does not overlap with that of any advanced load instruction (e.g., I24), the entries in ALAT 98 corresponding to the particular advanced load instructions remain in ALAT 98.

It should be appreciated that a load instruction which is advanced may be moved ahead of multiple store instructions, each of which may potentially collide with the load instruction. A single check instruction following a sequence of store instructions may be used to detect if any of the multiple store instructions collide with the load instruction since executing each store instruction includes searching all of the entries in ALAT 98 to determine if a collision occurred. Thus, the check instruction is independent of the number of store instructions in the program since a separate check instruction replaces each load instruction which is advanced in step 533 and each check instruction reviews ALAT 98 as described below in step 623.

It should also be appreciated that a collision can occur between an advanced load and a store, as discussed above, even if the starting addresses for the data accessed by those instructions are not identical. In particular, each instruction may access multiple bytes of data. Thus, a collision can occur if there is any overlap between the range of memory addresses occupied by the data read by the advanced load, and the range of memory addresses occupied by the data written by the store. The detection of a collision can be performed in numerous ways, and the present invention is not limited to any particular implementation. For example, a full range comparison can be performed between the addresses for the data written by the advanced load and read by the store. However, a full range comparison can be expensive to implement in hardware. Therefore, in accordance with one embodiment of the invention, a technique is employed for determining collisions without performing a full range comparison of the addresses for the data accessed by the advanced load and the store.

In accordance with this embodiment of the present invention, a preference is given for size-aligning data stored in memory, so that the starting address for a block of data is preferably an even multiple of its size. For example, a block of data including four bytes is preferably stored at an address wherein the two least significant bits (LSBs) are zeros, a block of eight bytes is preferably stored at an address wherein the three LSBs are zeros, etc. When the data is size-aligned, a collision can be detected by simply performing a direct equality comparison of the starting addresses for the data accessed by the advanced load and the store. It should be appreciated that a direct equality comparison is significantly less costly to implement in hardware than a full range comparison. When data is misaligned, if there is a limited amount of misalignment such that the misaligned data can fit in a larger, size-aligned data range, then in one embodiment of the invention, the hardware processes the instruction, (e.g., a load) which accesses the misaligned data as if it were accessing the larger size-aligned data range. For example, if a load accesses eight bytes of misaligned data in memory, but the data accessed by the load would fit into a size-aligned thirty-two byte range, then the load is treated as accessing thirty-two bytes of data. It should be appreciated that by treating the instruction as employing a larger block of size-aligned data, there may be situations where there is an overlap of the data addresses accessed by an advanced load and a store instruction, but not an overlap of the actual data (eight bytes in the example above) actually accessed by one of the instructions, resulting in the detection of a false collision. This performance penalty is a price paid to reduce the complexity of the hardware for detecting collisions. If data is significantly misaligned and does not fit into a reasonably large size-aligned data range, then the hardware will not process the load or store instruction. For loads, no entry is inserted into ALAT 98, which causes a collision to be indicated. Although this may result in false collisions being detected, this performance penalty is a price paid to reduce the complexity of the hardware for detecting collisions. For store instructions which are significantly misaligned, the instruction may be separated into a sequence of smaller stores instructions. In one embodiment, hardware may be used to separate the larger store into the sequence of multiple stores. In another embodiment, a misaligned store which cannot fit into a size-aligned data range may cause an interrupt, and the operating system handles the store by separating the store instruction into a sequence of smaller store instructions. In both embodiments of handling a misaligned store instruction, each of the smaller stores in the sequence is checked against the valid entries in ALAT 98, as described in step 618. If the range of memory space for any of the smaller stores overlaps the range of memory space of an advanced load, then a collision would be indicated as described in step 621. Thus, executing each of the smaller stores provides the same result as executing a single larger store.

In another embodiment of the present invention, a further savings in the hardware employed to detect collisions is achieved by using partial addresses for the equality comparison by ignoring one or more of the most significant bits (MSBs) of the addresses. Ignoring one or more of the MSBs results in a reduction in the size of ALAT 98 and in the hardware that performs the equality comparison, since fewer bits are stored in ALAT 98, for each entry and fewer bits are compared. For example, for a 64-bit data address, only the twenty least significant bits (LSB) of the load can be saved in ALAT 98 and used in the equality comparison.

It should be appreciated that ignoring one or more of the MSBs may result in the detection of some false collisions. In particular, when ALAT 98 is searched in executing a store instruction (e.g., in step 618), the complete starting addresses for the data of the store and the data of the load may be identical for the LSBs over which the equality comparison is performed (e.g., the twenty LSBs), but may differ for one or more of the MSBs that are ignored. When this occurs, the routine of FIG. 9 will perform as if a collision had actually occurred, e.g., by switching control flow to the recovery code. It should be appreciated that false detections will therefore result in some performance penalty due to recovering from collisions that did not in fact take place. This performance penalty is a price paid to reduce the complexity of the hardware for detecting collisions. A balance between these competing factors can be considered when determining how many (if any) MSBs to ignore in the detection scheme.

In step 623, the chk.a instruction (e.g., I25) is executed for the advanced load instruction executed in step 606. In one embodiment, the chk.a instruction reviews ALAT 98 to determine if a collision occurred by determining if there is an entry for the advanced load instruction (e.g., I24). Using as an index the identity of the target register and register type used by the advanced load instruction (e.g., I24) for which information was updated in ALAT 98 in step 621, the chk.a instruction reviews ALAT 98. In step 624, if an entry is found in ALAT 98 corresponding to the particular advanced load replaced by the chk.a instruction, then the chk.a instruction recognizes that the store instruction (e.g., I22) and the load instruction (e.g., I24) advanced above the store did not collide. Therefore, the data read by the store instruction is valid, and the routine proceeds to finish execution of the instruction sequence in step 630.

However, if the chk.a instruction reviews ALAT 98 in step 624 and does not see an entry in ALAT 98 corresponding to the register address used by the advanced load instruction (e.g., I24), then the chk.a instruction (e.g., I25) determines that the store and advanced load instructions may have accessed the same memory space (i.e., collided). Thus, further steps are taken to ensure the accuracy of the advanced load instruction and the calculation instructions that have been executed based on the advanced load instruction (e.g., I24). In one embodiment, when a possible collision is detected, control flow of the program is changed to execute recovery code. As discussed above, this can be done numerous ways (e.g., by branching or using an exception handling technique). It should be appreciated that ALAT 98 can be implemented with a number of entries that may not be sufficient to support all of the advanced local instructions that may be included in a program being executed. In the embodiment illustrated in FIG. 9, the chk.a instruction branches to recovery code in step 633. An example of recovery code is shown in FIG. 7 as instructions I24r, I26r and I23r, which are essentially copies of comments I24, I26 and I23.

In step 636, the load instruction (e.g., I24) that was advanced in step 524 is re-executed. In step 639, instructions dependent on the advanced load instruction (e.g., I24) are re-executed. In the example of FIG. 7, the re-executed load instruction I24r and dependent add instruction I26r are shown. These instructions are re-executed after the store instruction to provide the proper results of the load instruction I24r and its dependent calculations I26r. In one embodiment, the recovery code may be any combination of instructions determined by the compiler that provides the same result as the originally executed load and dependent calculation instructions.

In step 642, the control flow returns from the recovery code back to the compiled execution schedule. This can be done, for example, using a branch instruction such as I23r in FIG. 7. Next, the execution of the scheduled instructions continues until the end of the program in step 630.

For example, in one embodiment ALAT 98 has space for entries corresponding to thirty-two advanced instructions. In this example embodiment, if there are more than thirty-two advanced instructions in an executed program, then ALAT 98 will not have enough space for information pertaining to all of the advanced instructions. When ALAT 98 is full and a new advanced instruction is executed, a replacement scheme can be used to take out a valid entry in ALAT 98 to make room for the new instruction. Furthermore, in one embodiment of the present invention, when execution at runtime switches between processes (such as between separate compiled programs), the entries in ALAT 98 may be saved for later restoration, or may be invalidated. Thus, in some instances, a chk.a instruction may not find an entry for a particular advanced instruction, even though a collision did not occur for that instruction.

As discussed above, the present invention is not limited to a particular ALAT structure and may include other alternative embodiments for determining whether there was a collision between a load and a store instruction. For example, other data structures or compare circuits may be used. Also, an ALAT or other structure used may vary in size and in the number of fields used. In addition, separate ALATs or data structures may be used for each of multiple register sets. For example, in one embodiment an ALAT may be used for general and floating-point register sets.

The present invention may be extended to include an instruction that is both control and data speculative.

The transfer of control from the chk.s and chk.a instructions to the recovery code can be implemented in any of a number of ways. For example, the chk.s and chk.a instructions each may behave as a branch instruction where the address of the first instruction in the recovery code is contained in the chk.s or chk.a instruction itself. Alternatively, the chk.s or chk.a instruction may generate a particular exception and the exception handler may use a value in the chk.s or chk.a instruction to identify the corresponding recovery code and then transfer control to that recovery code with a trampoline mechanism, such as described in the above incorporated patent application Ser. No. 09/521,160, filed on Mar. 8, 2000, entitled "EMULATED BRANCH EFFECTED BY TRAMPOLINE MECHANISM." The exception handler may also use the address of the chk.a or chk.s instruction, which is the address memory location where the instruction is stored, to identify the location of the recovery code. The recovery code can be based on a table created by the compiler which includes addresses of check instructions which were added by the compiler to a compiled source program. The recovery code executed is therefore identified by which check instruction is executed.

The present invention allows instructions to be advanced out of turn, even when the compiler is not certain that the instruction advanced will not collide with a later instruction. As discussed above, some conventional compilers may advance a single load instruction moved ahead of a store even if not certain that the load and store will not collide. At runtime, if there was a collision, the load instruction would be re-executed in-line in the compiled execution schedule. In contrast, in one embodiment of the present invention, optimization of instruction execution is achieved by advancing not just a load ahead of store, but also calculations dependent thereon. This enables a compiler and scheduler to most efficiently use multiple execution units at one time. Further, instead of simply re-executing the load instruction if there is a collision, a check instruction is executed which determines if there was a collision and the control flow is changed to recovery code that includes the load instruction and its dependent calculations. Thus, multiple sections of code may be executed independently and in parallel.

Computer system 50 according to the present invention efficiently combines the ALAT mechanism for advanced loads and the register stack mechanism implemented with software-controlled renaming of registers. When combining the ALAT mechanism and the register stack mechanism, the ALAT must not record software-visible register numbers. One problem which could arise if the ALAT were to record software-visible register numbers is illustrated by the following Example I.

EXAMPLE I

Procedure A performs an advanced load from a memory location X into general register GRm+1.

Procedure A calls procedure B.

Register renaming occurs, in which the GRm+1 general register name is remapped to a new physical register.

Procedure B does a store to memory location X.

Procedure B does an advanced load from memory location Y into general register GRm+1.

Procedure B does a store to memory location Z.

Procedure B checks its advanced load to general register GRm+1 and determines that Procedure B's advanced load has succeeded.

Procedure B returns to procedure A.

Procedure A checks its advanced load to general register GRm+1 and determines (incorrectly) that procedure A's advanced load has succeeded.

One way of overcoming the above-example problem would be to have the software-controlled register renaming adjust all of the entries in the ALAT. This solution, however, is quite complex in implementation and would significantly increase the size of the ALAT.

For this reason, ALAT 98 according to the present invention records the physical register number accessed in the advanced load instruction, such as recorded in physical register number field 118. The physical register number in physical register number field 118 of ALAT 98 will match with the software-visible register provided that all calls are matched with returns. In situations where all calls do not match with returns, ALAT 98 is cleared by software to avoid any stale entries. This clearing mechanism, however, does not completely solve the above-example problem, because the physical registers are re-used when the number of call instructions that are executed becomes high enough to cause the current register stack frame to wraparound the conceptual circle of physical registers.

In one embodiment, the number of bits (N) of the current wraparound count state 99 and the corresponding register wraparound field 122 is set to zero. In this embodiment, when a call is made which causes the current register stack frame to move past some arbitrary point in the conceptual circle of physical registers to cause a register address wraparound, then all entries in ALAT 98 are cleared. In this embodiment, the above example problem is solved because no check operation will ever see an entry that was inserted by some other procedure. This solution, where the number of bits (N) of the current wraparound count state 99 and register wraparound field 122 is equal to zero, however, causes performance degradation because this solution causes an excessive amount of clearing of ALAT 98, which triggers excessive advanced load recovery.

In a preferred embodiment of the present invention, the current wraparound count state 99 and the corresponding register wraparound field 122 includes N-bits, where N is greater than zero. The N-bits of the current wraparound count state 99 and the corresponding register wraparound field 122 represent an N-bit count value which augments the physical register number field 118 of ALAT 98 to form an extended physical register number for the advanced load instruction. In this preferred embodiment of the present invention, the entries in ALAT 98 essentially represent that there are more physical registers than actually exist (i.e., $2^N$ times as many physical registers are represented by the augmented physical register number in the ALAT than the number of actual physical registers).

When a call remapping event causes the physical registers to wraparound, the N-bit current wraparound count state 99 is incremented, and is used on subsequent advanced load instructions to determine the N-bit wraparound count value to write into the register wraparound field 122 in the corresponding ALAT entry. A call remapping event herein refers to any event responsive to a procedure being called which causes allocation of new registers. The allocation of new registers is typically performed immediately upon a procedure being called. In one embodiment, the call remapping event includes execution of a call instruction by the caller procedure followed by execution of a special allocation instruction by the callee procedure which allocates more registers for use by the callee procedure. In this embodiment, the special allocation instruction may cause the physical registers to wraparound. On a return remapping event which causes the physical registers to unwrap, the N-bit current wraparound count state 99 is decremented, and is used on subsequent advanced load instructions to determine the N-bit wraparound count value to write into the register wraparound field 122 in the corresponding ALAT entry.

When a call remapping event causes the physical registers to wraparound, the N-bit current wraparound count state 99 is incremented, and ALAT 98 is then searched for entries which have a wraparound count value in their register wraparound field 122 matching the updated current wraparound count state 99, and all entries which have the matching wraparound count value in their register wraparound field 122 are cleared. Similarly, when a return remapping event causes the physical registers to unwrap, the N-bit current wraparound count state 99 is decremented, and ALAT 98 is then searched for entries which have a wraparound count value in their register wraparound field 122 matching the updated current wraparound count state 99, and all entries which have the matching wraparound count value in their register wraparound field 122 are cleared.

The present invention allows the ALAT mechanism for implementing advanced loads and the register stack mechanism implemented with the software-controlled renaming of registers to be efficiently operated together by allowing the ALAT according to the present invention to record the physical register number used in the advanced load without incurring excessive advanced load recovery costs.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A computer system comprising:
    memory storing a compiled program including:
        a store instruction;
        a load instruction scheduled before the store instruction; and
        a check instruction;
    a processor executing the compiled program;
    physical registers holding data for the compiled program, a portion of the physical registers forming a register stack which wraps around when full;
    N-bit current wraparound count state that tracks physical register remapping events which cause the register stack to wraparound or unwrap;
    an advanced load address table having entries corresponding to load instructions, each entry having at least one memory range field defining a range of memory locations accessed by a corresponding load instruction, a physical register number field corresponding to a physical register accessed in the corresponding load instruction, and an N-bit register wraparound field which corresponds to the N-bit current wraparound count state for the corresponding load instruction; and
    wherein the check instruction accesses the advanced load address table to determine whether the store instruction and the load instruction potentially accessed a common memory location.

2. The computer system of claim 1 wherein after the execution of the store instruction an absence of an entry corresponding to the load instruction in the advanced load address table indicates that a common memory location may have been accessed by the store and load instructions.

3. The computer system of claim 1 wherein the execution of the store instruction clears the entry in the advanced load address table corresponding to the load instruction if the store instruction and the load instruction accessed a common memory location.

4. The computer system of claim 1 wherein the execution of the store instruction clears the entry in the advanced load address table corresponding to the load instruction if the store instruction and the load instruction accessed a common range of memory.

5. The computer system of claim 1 wherein the N-bit register wraparound field augments the physical register number field to form an extended physical register number for the corresponding load instruction.

6. The computer system of claim 1 wherein the N-bit current wraparound count state is incremented in response to a call remapping event which causes the register stack to wraparound.

7. The computer system of claim 6 wherein after the N-bit current wraparound count state is incremented, the processor searches the advanced load address table for entries which have a wraparound count value in their register wraparound field matching the updated N-bit current wraparound count state and clears all entries in the advanced load address table which have the matching wraparound count value in their register wraparound field.

8. The computer system of claim 1 wherein the N-bit current wraparound count state is decremented in response to a return remapping event which causes the register stack to unwrap.

9. The computer system of claim 8 wherein after the N-bit current wraparound count state is decremented, the processor searches the advanced load address table for entries which have a wraparound count value in their register wraparound field matching the updated N-bit current wraparound count state and clears all entries in the advanced load address table which have the matching wraparound value in their register wraparound field.

10. The computer system of claim 1 wherein the at least one memory range field includes a memory address field and a memory access size field.

11. The computer system of claim 1 wherein each entry in the advanced load address table further includes a register type field indicating a type of physical register accessed in the load instruction.

12. The computer system of claim 11 wherein the type of physical registers that are accessible in the load instruction include general registers and floating-point registers.

13. The computer system of claim 1 wherein each entry in the advanced load address table further includes a valid bit field which indicates whether the entry is valid.

14. The computer system of claim 1 wherein the compiled program further includes:
    recovery code to which control is passed when the check instruction determines that the store instruction and the load instruction may have accessed a common memory location during execution of the program, the recovery code including code for re-execution of the load instruction.

15. The computer system of claim 1 wherein the compiled program further includes:
    at least one calculation instruction that is dependent on data read by the load instruction, the at least one calculation instruction being scheduled ahead of the store instruction.

16. The computer system of claim 15 wherein the compiled program further includes:
    recovery code to which control is passed when the check instruction determines that the store instruction and the load instruction may have accessed a common memory location during execution of the program, the recovery code including code for re-execution of the load instruction and the at least one calculation instruction.

17. A method of executing instructions in a computer system, the method comprising:

holding data for programs executed in the computer system in physical registers, wherein a portion of the physical registers form a register stack which wraps around when full;

executing a load instruction that is scheduled before a store instruction;

maintaining an N-bit current wraparound count state that tracks physical register remapping events which cause the register stack to wraparound or unwrap;

recording an entry corresponding to the load instruction in an advanced load address table having entries corresponding to load instructions, each entry having at least one memory range field defining a range of memory locations accessed by a corresponding load instruction, a physical register number field corresponding to a physical register accessed in the corresponding load instruction, and an N-bit register wraparound field which corresponds to the N-bit current wraparound state for the corresponding load instruction;

executing the store instruction; and executing a check instruction that accesses the advanced load address table to determine whether the store instruction and the load instruction potentially accessed a common memory location.

18. The method of 17 wherein after the execution of the store instruction an absence of an entry corresponding to the load instruction in the advanced load address table indicates that a common memory location may have been accessed by the store and load instructions.

19. The method of claim 17 wherein the step of executing the store instruction includes:

clearing the entry in the advanced load address table corresponding to the load instruction if the store instruction and the load instruction accessed a common memory location.

20. The method of claim 17 wherein the step of executing the store instruction includes:

clearing the entry in the advanced load address table corresponding to the load instruction if the store instruction and the load instruction accessed a common range in memory.

21. The method of claim 17 wherein the N-bit register wraparound field augments the physical register number field to form an extended physical register number for the corresponding load instruction.

22. The method of claim 17 further comprising:

incrementing the N-bit current wraparound count state in response to a call remapping event which causes the register stack to wraparound.

23. The method of claim 22 wherein after the incrementing step is performed, the method performs the steps of:

searching the advanced load address table for entries which have a wraparound count value in their register wraparound field matching the updated N-bit current wraparound count state; and clearing all entries in the advanced load address table which have a matching wraparound count value in their register wraparound field.

24. The method of claim 17 further comprising:

decrementing the N-bit current wraparound count state in response to a return remapping event which causes the register stack to unwrap.

25. The method of claim 24 wherein after the decrementing step is performed, the method performs the steps of:

searching the advanced load address table for entries which have a wraparound count value in their register wraparound field matching the updated N-bit current wraparound count state; and clearing all entries in the advanced load address table which have the matching wraparound count value in their register wraparound field.

26. The method claim 17 wherein the at least one memory range field includes a memory address field and a memory access size field.

27. The method of claim 17 wherein each entry in the advanced load address table further includes a register type field indicating a type of physical register accessed in the load instruction.

28. The method of claim 27 wherein the type of physical registers that are accessible in the load instruction include general registers and floating-point registers.

29. The method of claim 17 wherein each entry in the advanced load address table further includes a valid bit field which indicates whether the entry is valid.

30. The method of claim 17 further comprising:

executing recovery code including re-executing the load instruction when the check instruction determines that the store instruction and the load instruction may have accessed a common memory location.

31. The method of claim 17 further comprising:

executing at least one calculation instruction that is dependent on data read by the load instruction, the at least one calculation instruction being scheduled ahead of the store instruction.

32. The method of claim 17 further comprising:

executing recovery code including re-executing the load instruction and the at least one calculation instruction when the check instruction determines that the store instruction and the load instruction may have accessed a common memory location.

* * * * *